United States Patent
Fukuchi et al.

(10) Patent No.: US 7,527,201 B2
(45) Date of Patent: May 5, 2009

(54) METHOD OF FORMING AN OPTICAL PATTERN, OPTICAL PATTERN FORMATION SYSTEM, AND OPTICAL TWEEZER

(75) Inventors: Norihiro Fukuchi, Hamamatsu (JP);
Yasunori Igasaki, Hamamatsu (JP);
Takashi Inoue, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 547 days.

(21) Appl. No.: 11/214,060

(22) Filed: Aug. 30, 2005

(65) Prior Publication Data
US 2006/0043184 A1 Mar. 2, 2006

Related U.S. Application Data

(60) Provisional application No. 60/605,576, filed on Aug. 31, 2004.

(30) Foreign Application Priority Data
Oct. 1, 2004 (JP) .................... P2004-290597
Oct. 1, 2004 (JP) .................... P2004-290620

(51) Int. Cl.
*G06K 7/10* (2006.01)
(52) U.S. Cl. ................. 235/455; 235/454
(58) Field of Classification Search .......... 235/445, 235/443, 455, 454
See application file for complete search history.

(56) References Cited

U.S. PATENT DOCUMENTS 3,744,871 A * 7/1973 Takeda et al. ............ 359/11
6,021,223 A 2/2000 Toyoda et al. ............ 382/214
6,163,391 A 12/2000 Curtis et al.
6,710,292 B2 3/2004 Fukuchi et al. ......... 219/121.73
6,762,865 B1 7/2004 Edwards
7,161,722 B2 * 1/2007 Brotherton-Ratcliffe et al. ................. 359/12
2003/0010763 A1 1/2003 Fukuchi et al.
2005/0063032 A1 3/2005 Igasaki et al. ............ 359/237

FOREIGN PATENT DOCUMENTS

| EP | 0 540 759 B1 | 9/1997 |
| JP | 07-028085 | 1/1995 |
| JP | 10-186283 | 7/1998 |
| JP | 2001-272636 | 10/2001 |
| WO | WO 03/036368 | 5/2003 |

OTHER PUBLICATIONS

MacDonald, M.P. et al., "Microfluidic sorting in an optical lattice", *Nature*, vol. 426, Nov. 27, 2003, pp. 421-424.

* cited by examiner

*Primary Examiner*—Daniel St.Cyr
(74) *Attorney, Agent, or Firm*—Drinker Biddle & Reath LLP

(57) ABSTRACT

Reading light (26) is phase-modulated by a phase-modulating spatial light modulator (12), the phase-modulated reading light (26) is Fourier-transformed, and an image of the Fourier-transformed reading light is focused on an output plane (24) to form an optical pattern. In this method, 0-order light in the phase-modulated reading light (26) is blurred on the output plane (24). As the 0-order light is blurred, the luminance of the 0-order light is reduced on the output plane (24). Since the 0-order light is not blocked, the shape of the optical pattern is not limited.

14 Claims, 12 Drawing Sheets

Fig.2
(a)
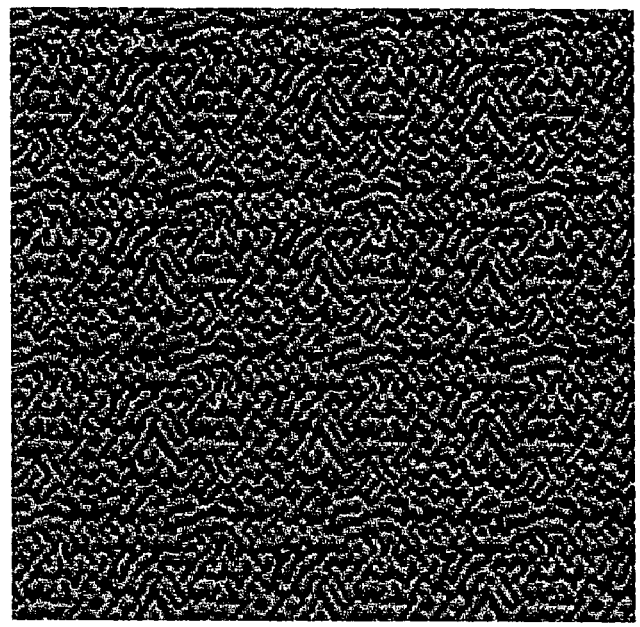
(b)
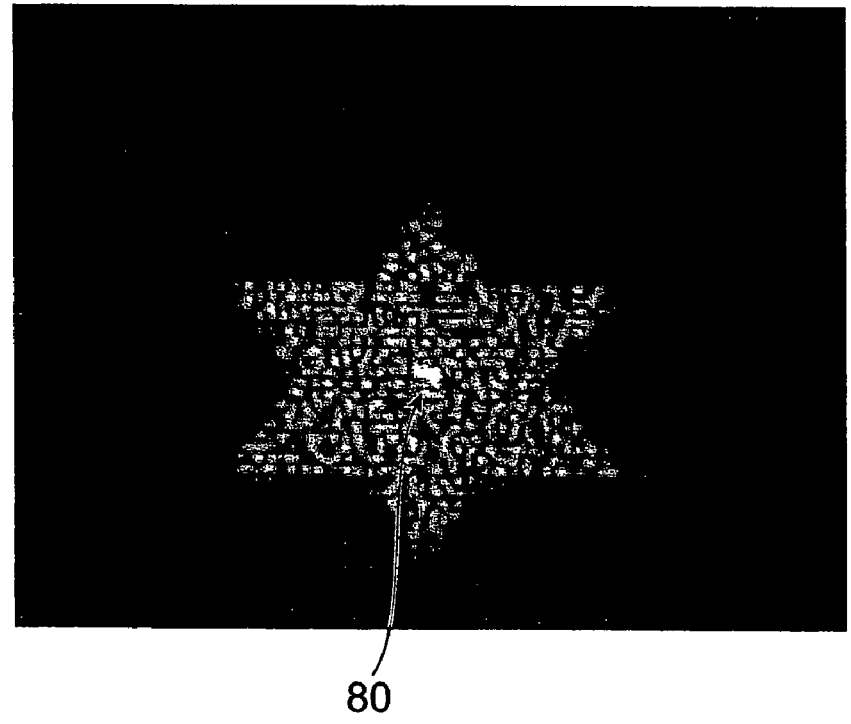
80

*Fig.3*
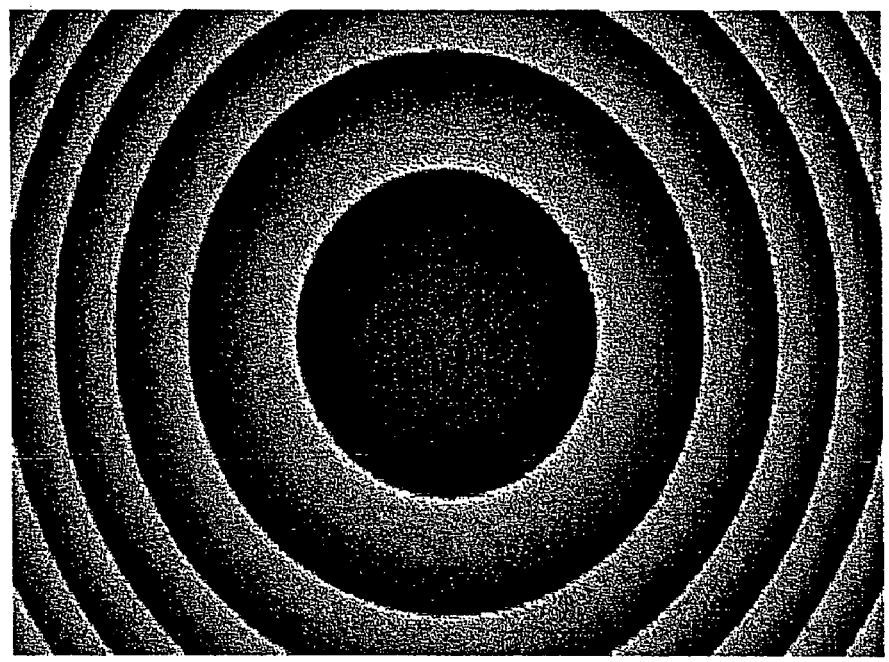
(a)
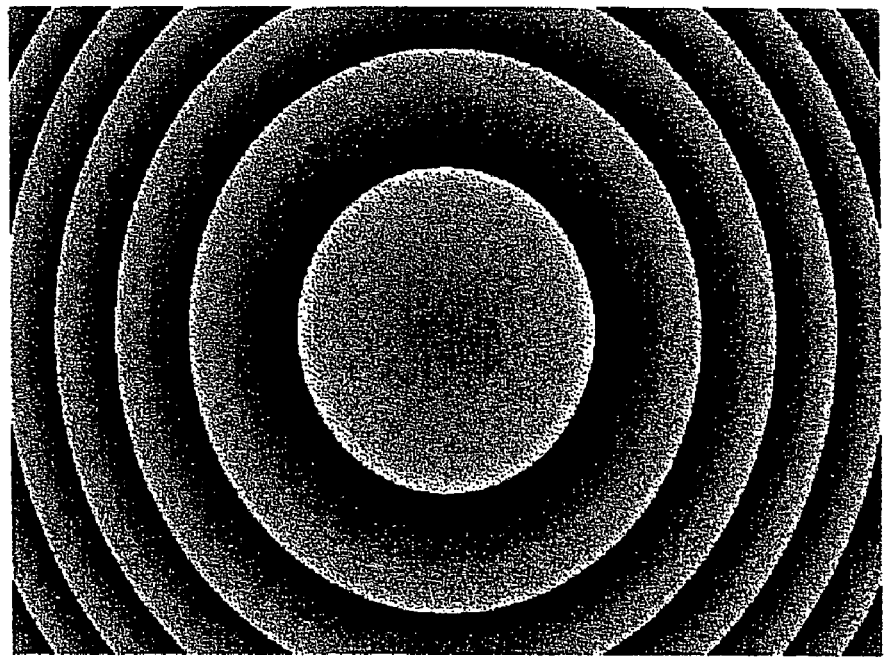
(b)

Fig.4
(a)
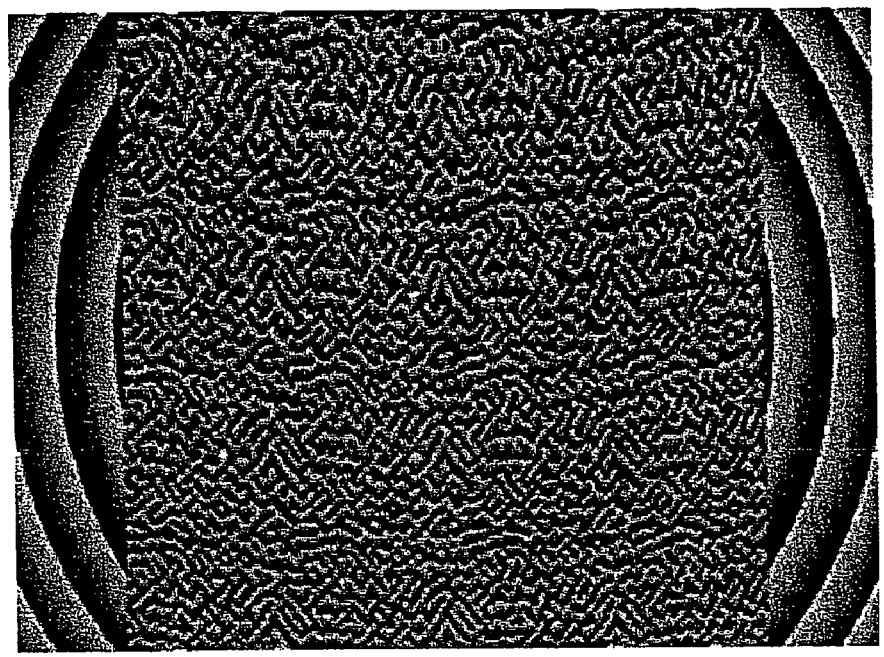
(b)
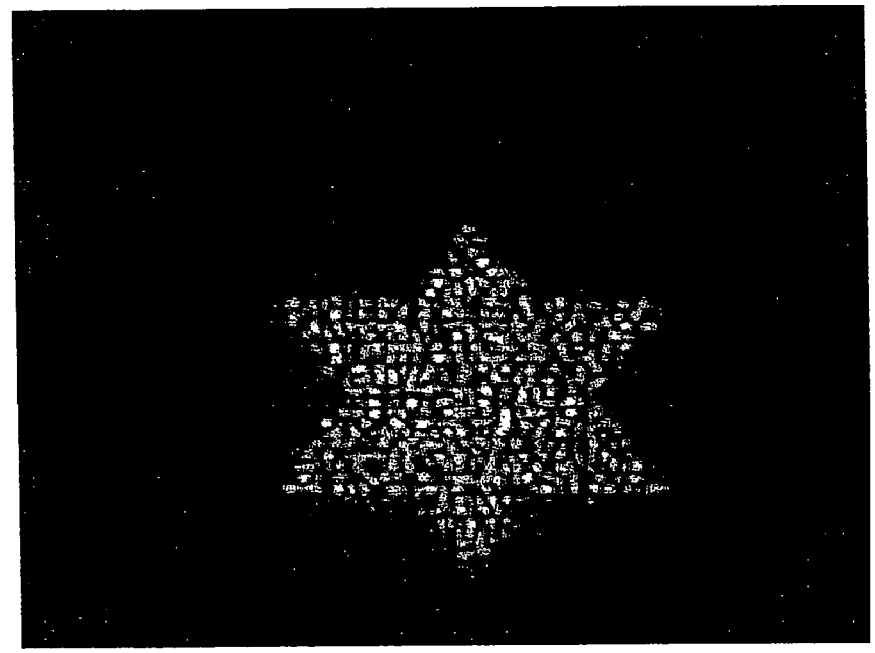

Fig.7
(a)
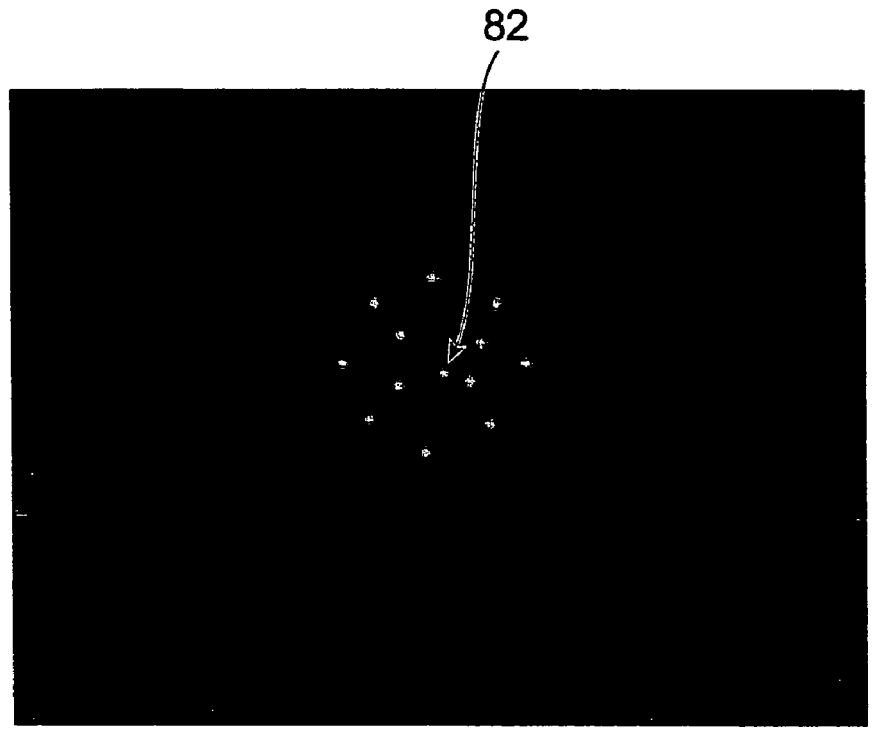
(b)
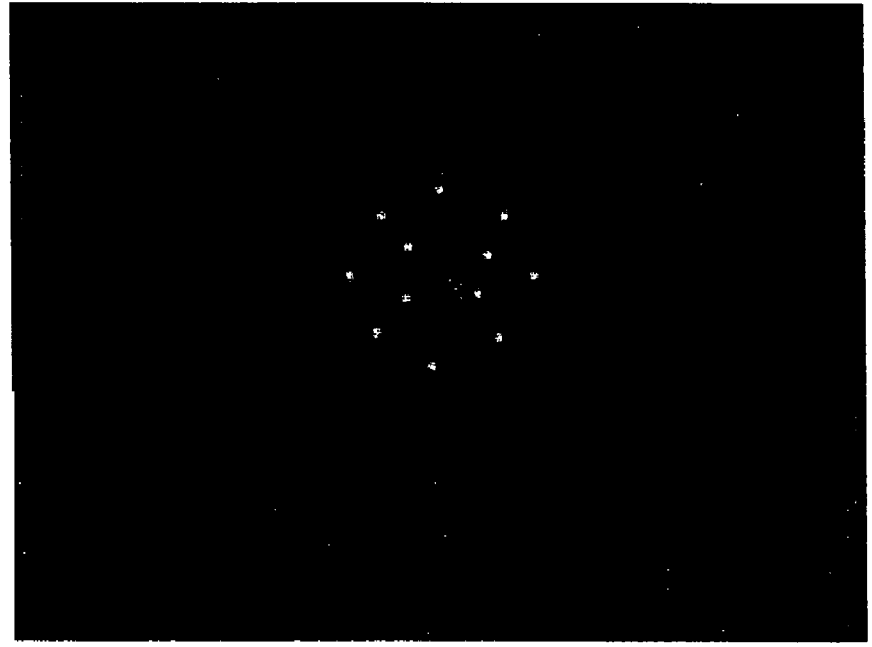

Fig.10
(a)
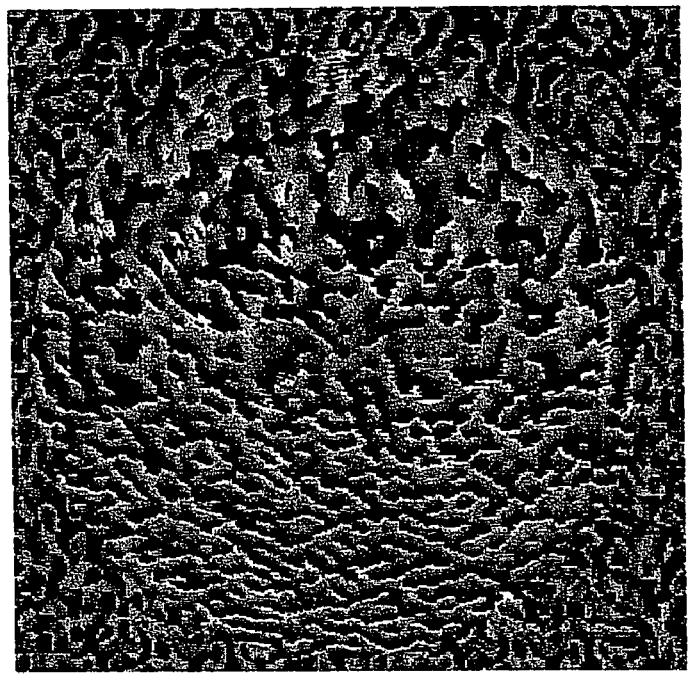
(b)
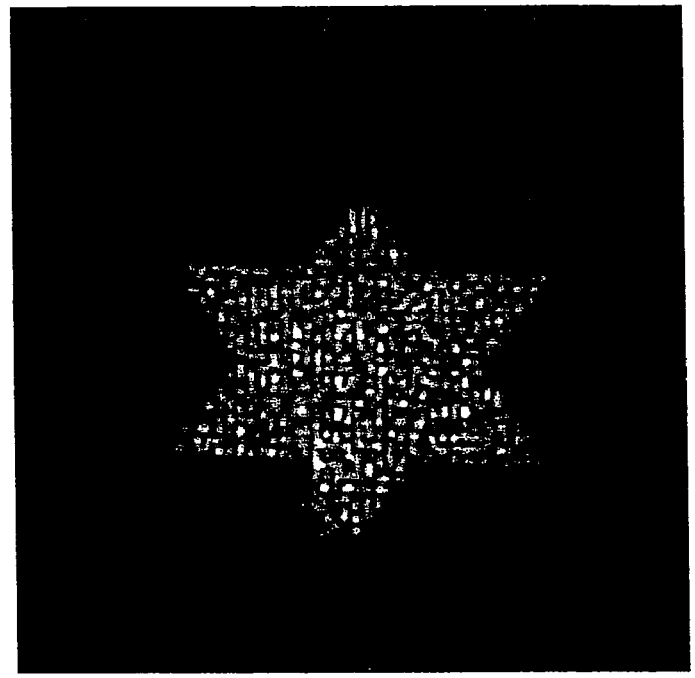

Fig.12
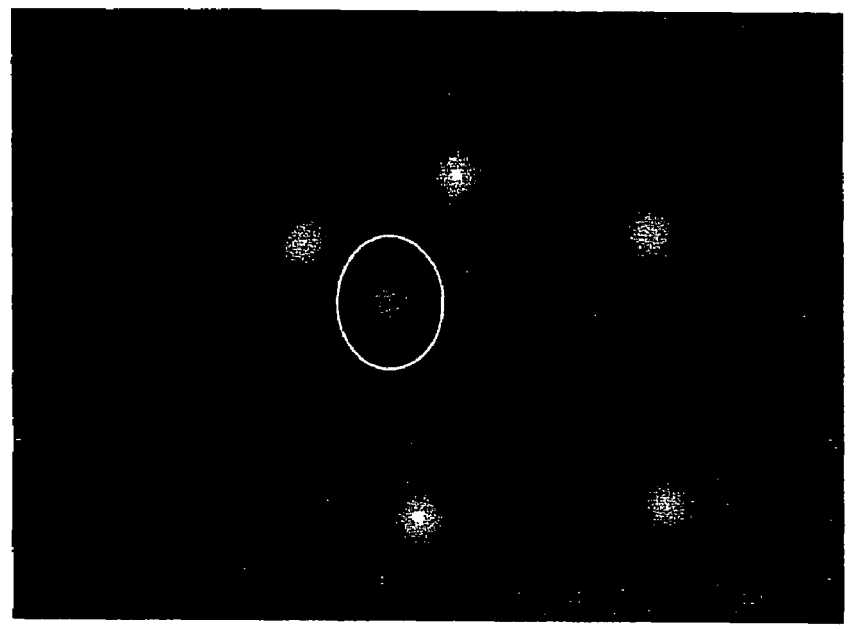
(a)
(b)

METHOD OF FORMING AN OPTICAL PATTERN, OPTICAL PATTERN FORMATION SYSTEM, AND OPTICAL TWEEZER

CROSS-REFERENCE TO RELATED APPLICATIONS

This application claims the benefit of U.S. Provisional Application No. 60/605,576, filed Aug. 31, 2004.

BACKGROUND OF THE INVENTION

1. Field of the Invention

The present invention relates to formation of optical patterns by means of a spatial light modulator.

2. Related Background Art

The optical pattern formation (or wavefront shaping) technology of producing a two-dimensional optical pattern at high efficiency of utilization of light (theoretically, at almost 100%) is one of the applications of PAL-SLM (Parallel Aligned Nematic Liquid Crystal Spatial Light Modulator), which is a phase-modulating spatial light modulator. Currently, the optical pattern formation technology is drawing attention in the fields of laser processing and optical tweezers. The optical pattern formation technology can be applied, in the field of laser processing, to laser marking that carves any given pattern, and in the field of particle trapping like the optical tweezers, to multipoint control.

When an optical pattern is formed by modulating the phase of reading light by a PAL-SLM and Fourier-transforming the modulated light, the optical pattern also includes an appearance of 0-order light which is not affected by the phase modulation, in addition to a desired pattern corresponding to the phase modulation. The reason why the 0-order light appears is that there occurs deviation from the ideal phase modulation due to the influence of MTF (Modulation Transfer Function) and the surface precision of the PAL-SLM. Since the 0-order light is noise, it can possibly cause a problem in application fields of optical pattern formation. For example, in a laser processing application, a portion which irradiated with the 0-order light will be strongly processed, and in an optical tweezer application, a sample will be trapped at the position of the 0-order light. Japanese Patent Application Laid-Open No. 2001-272636 discloses a technique of placing a shield plate for the 0-order light on an optical path to block the 0-order light. Japanese Patent Application Laid-Open No. 7-28085 suggests a technique of providing an insensitive portion at a position where the order light is incident in an optically addressing region of the PAL-SLM.

SUMMARY OF THE INVENTION

However, the shapes of optical patterns formed by the above techniques are limited to those adequately separated from the 0-order light. If a target optical pattern is located near the 0-order light or overlaps with it, the optical pattern is blocked together with the 0-order light, so that the shape of the optical pattern is degraded.

In view of the above, an object of the invention is to provide a method of forming an optical pattern, an optical pattern formation system and an optical tweezer that are capable of reducing the 0-order light without restriction on the shape of the optical pattern.

In one aspect, the invention relates to a method of forming an optical pattern, which comprises generating reading light having a phase, modulating the phase of the reading light using a phase-modulating spatial light modulator, and Fourier-transforming the modulated reading light and focusing an image of the Fourier-transformed reading light on an output plane. The Fourier-transformed reading light contains 0-order light, and the 0-order light is blurred on the output plane.

The Fourier-transforming the modulated reading light and focusing an image of the Fourier-transformed reading light may include focusing an image of the 0-order light on a plane different from the output plane, thereby blurring the 0-order light on the output plane.

The modulating the phase of the reading light may include feeding a phase pattern into the spatial light modulator while irradiating the spatial light modulator with the reading light to modulate the phase of the reading light according to the phase pattern. The Fourier-transforming the modulated reading light and focusing an image of the Fourier-transformed reading light may include using a lens having a focal plane and an optical axis to Fourier-transform the modulated reading light. The output plane may be located apart in parallel with the optical axis of the lens from the focal plane of the lens.

The method may further comprise producing the phase pattern by adding a subsidiary phase pattern with lens effect to a principal phase pattern corresponding to the optical pattern, prior to the modulating the phase of the reading light. This subsidiary phase pattern may be a Fresnel zone pattern.

In one embodiment, the generating the reading light may include providing a plane wave with a wavefront distortion to generate the reading light, and the producing the phase pattern may include adding a phase pattern for compensating the wavefront distortion, to the principal and subsidiary phase patterns.

In another embodiment, the generating the reading light may include providing a plane wave with a wavefront distortion to generate the reading light, and the method may further comprise producing the phase pattern by adding a subsidiary phase pattern for compensating the wavefront distortion to a principal phase pattern corresponding to the optical pattern, prior to the modulating the phase of the reading light.

The reading light generated from the plane wave has a phase distribution corresponding to the wavefront distortion. The producing the phase pattern may include inverting signs in the phase distribution to produce the subsidiary phase pattern.

In another aspect, the present invention relates to an optical pattern formation system. The system comprises a light emitting device for emitting reading light having a phase; a phase-modulating spatial light modulator for modulating the phase of the reading light while irradiated with the reading light; and a lens for Fourier-transforming the modulated reading light and focusing an image of the Fourier-transformed reading light on an output plane. The Fourier-transformed reading light contains 0-order light, and the 0-order light is blurred on the output plane.

The system according to the present invention may be so arranged that an image of the 0-order light is focused on a plane different from the output plane to blur the 0-order light on the output plane.

The system according to the present invention may further comprise a controller for producing a phase pattern to control the modulation by the spatial light modulator and feeding the produced phase pattern into the spatial light modulator. The lens for focusing the image of the reading light has a focal plane and an optical axis. The phase pattern may be arranged to control the modulation so as to displace the output plane in parallel with the optical axis of the lens from the focal plane of the lens.

The controller may produce the phase pattern by adding a subsidiary phase pattern with lens effect to a principal phase pattern corresponding to the optical pattern. This subsidiary phase pattern may be a Fresnel zone pattern.

The light emitting device may provide a plane wave with a wavefront distortion to generate the reading light. The controller may produce the phase pattern by adding a phase pattern for compensating the wavefront distortion to the principal and subsidiary phase patterns.

The controller may feed the phase pattern as an electric image signal into the spatial light modulator. The spatial light modulator may have a liquid crystal display device for displaying an optical image according to the fed image signal; an illumination device for illuminating the liquid crystal display device with illumination light to project the displayed optical image, the projected optical image having an intensity distribution; and a modulation element for receiving the reading light and the projected optical image and for modulating the phase of the reading light according to the intensity distribution of the projected optical image.

The system according to the present invention may further comprise a controller for producing the phase pattern by adding a subsidiary phase pattern for compensating a wavefront distortion to a principal phase pattern corresponding to the optical pattern to feed the produced phase pattern into the spatial light modulator. The light emitting device may provide a plane wave with the wavefront distortion to generate the reading light.

The reading light generated from the plane wave has a phase distribution corresponding to the wavefront distortion. The controller may produce the subsidiary phase pattern by inverting signs in the phase distribution.

In still another aspect, the present invention relates to an optical tweezer comprising any of the above-described optical pattern formation systems. This optical tweezer is arranged to irradiate a sample with the optical pattern formed by the optical pattern formation system to trap the sample.

Further scope of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2 shows a CGH and an optical pattern in a comparative example.

FIG. 3 shows phase patterns with lens effect.

FIG. 4 shows a CGH and an optical pattern in the first embodiment.

FIG. 7 shows optical patterns formed in a comparative example and in the second embodiment.

FIG. 10 shows a CGH and an optical pattern in the fourth embodiment.

FIG. 12 shows optical patterns formed in a comparative example and in the fifth embodiment.

DETAILED DESCRIPTION OF THE PREFERRED EMBODIMENTS

Figure 1:
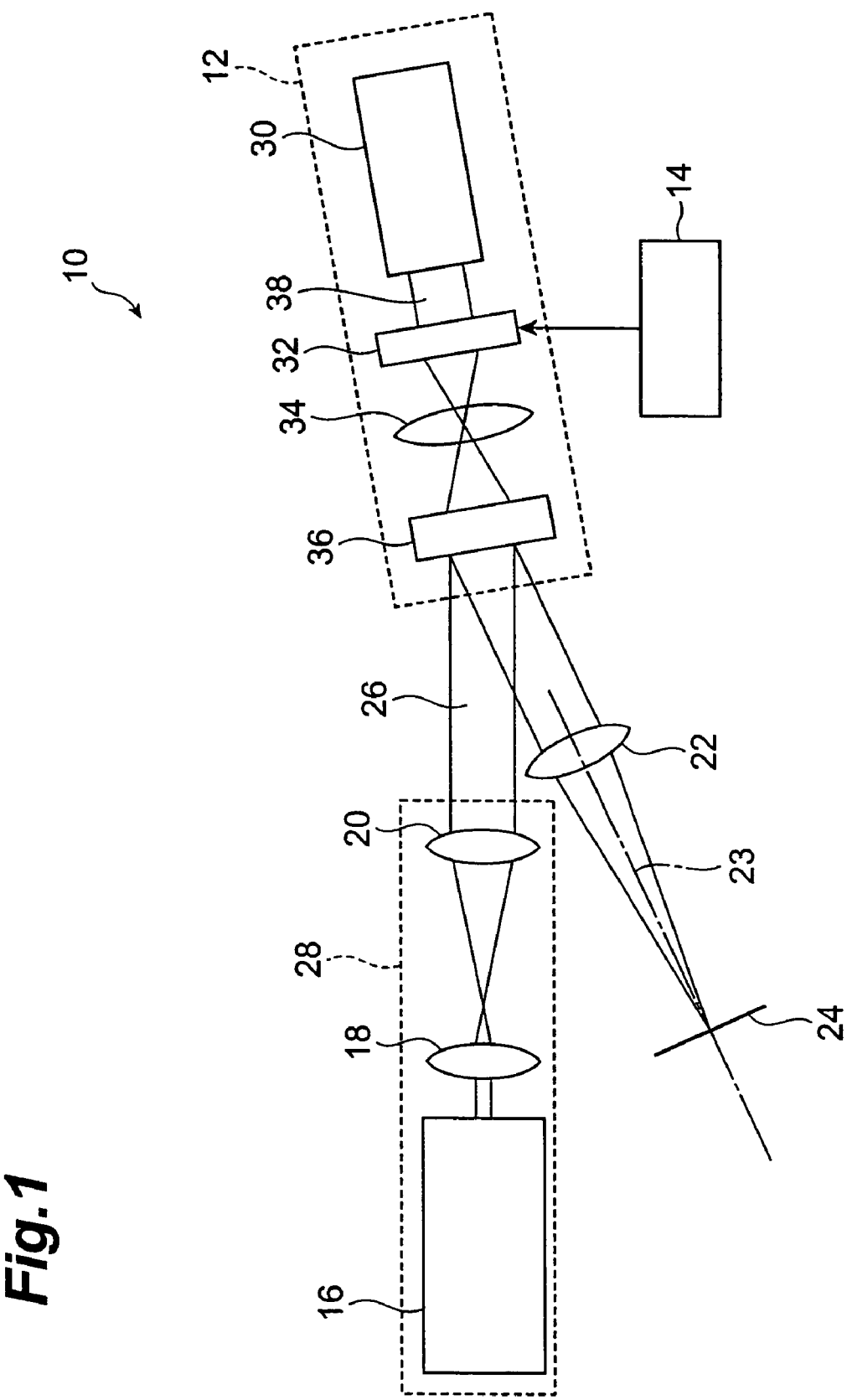
FIG. 1 is a schematic diagram showing the configuration of the first embodiment.

The preferred embodiments of the present invention will be described below in greater detail with reference to the accompanying drawings. To facilitate understanding, identical reference numerals are used, where possible, to designate identical or equivalent elements that are common to the embodiments, and, in subsequent embodiments, these elements may not be further explained.

First Embodiment

FIG. 1 is a schematic diagram showing the configuration of an optical pattern formation system 10 in the first embodiment of the present invention. The optical pattern formation system 10 has a spatial light modulator 12, a controller 14, a reading light source 16, a beam expander 18, a collimator lens 20, and a Fourier transform lens 22, and is able to form a desired two-dimensional optical pattern on an output plane 24.

The spatial light modulator 12 is an example of the phase-modulating spatial light modulator of an electrically addressing type and is called a PPM (Programmable Phase Modulator). The spatial light modulator 12 has a writing light source 30, a transmissive LCD (Liquid Crystal Display) 32, an imaging lens 34, and a PAL-SLM (Parallel-Aligned Nematic Liquid Crystal Spatial Light Modulator) 36.

The writing light source 30 emits writing light 38 of a plane wave having a uniform two-dimensional intensity distribution, onto the LCD 32. The writing light source 30 is composed, for example, of a laser element, and a collimator lens for collimating a coherent laser beam emitted from the laser element. However, the writing light source 30 does not have to be limited to the laser light source.

The LCD 32 displays an image according to an electric image signal fed from the controller 14. The LCD 32 transmits the writing light 38 and modulates the intensity distribution of the writing light 38 in accordance with the luminance distribution of the displayed image. Namely, the LCD 32 is an intensity-modulating spatial light modulator of the electrically addressing type for intensity-modulating the writing light 38 in accordance with the pattern of the displayed image.

The imaging lens 34 focuses the image of the intensity-modulated writing light 38 on PAL-SLM 36. Namely, the writing light source 30 and the imaging lens 34 project the image displayed on the LCD 32, onto the PAL-SLM 36.

The PAL-SLM 36 is a phase-modulating spatial light modulator of an optically addressing type. Since the structure and operation of PAL-SLM 36 are well known, only brief description thereof will be given herein. The detailed description of PAL-SLM 36 is disclosed, for example, in PCT International Publication No. 03/036368.

The PAL-SLM 36 is optically addressed by the writing light 38 irradiating the back part of the PAL-SLM 36, modulates the phase of the reading light 26 irradiating the front part thereof, and gives the reading light 26 a two-dimensional phase distribution according to the intensity distribution of the writing light 38. A photoconductive layer is provided in the back part of the PAL-SLM 36, and a liquid crystal layer in the front part thereof. The liquid crystal layer and the photoconductive layer are placed between a pair of transparent electrodes, and a voltage is applied through these transparent electrodes to the liquid crystal layer. When the photoconductive layer is irradiated with the intensity-modulated writing light 38, a refractive-index distribution according to the intensity distribution of the writing light is formed in the liquid crystal layer. When this liquid crystal layer is irradiated with the reading light 26, the phase of the reading light 26 is modulated according to the refractive-index distribution. In this manner, the reading light 26 is given a phase distribution according to the intensity distribution of the writing light 38. The PAL-SLM 36 is a reflective phase modulator and is provided with a mirror layer between the liquid crystal layer and the photoconductive layer. The phase-modulated reading light 26 is reflected by the mirror layer to emerge from the PAL-SLM 36.

The controller 14 produces a CGH (Computer Generated Hologram) according to a desired optical pattern, and supplies an image signal corresponding to the CGH to the LCD 32, to make the image of CGH displayed on the LCD 32. The CGH is a data for controlling the phase modulation performed by the PAL-SLM 36, and for indicating a two-dimensional distribution of phases, i.e., a phase pattern to be given to the reading light 26. The luminance of each pixel in the CGH image indicates a phase value. The spatial light modulator 12 phase-modulates the reading light 26 in accordance with the luminance distribution of the CGH image. An example of the controller 14 is a computer system installed with CGH producing software. The CGH can be produced by any technique, such as the simulated annealing technique or the kinoform technique.

The reading light source 16, beam expander 18, and collimator lens 20 constitute a light emitting device 28 for emitting the reading light 26 onto the spatial light modulator 12. The reading light 26 is emitted from the reading light source 16 and travels through the beam expander 18 and collimator lens 20 to irradiate the PAL-SLM 36.

In the present embodiment the reading light source 16 is a laser element, which generates a coherent, linearly polarized laser beam. It is, however, noted that the reading light source 16 is by no means limited to the laser light source. The beam expander 18 expands the diameter of the laser beam and the collimator lens 20 collimates this laser beam. Thus, the reading light source 16, beam expander 18, and collimator lens 20 constitute an optical system for generating a plane wave. The reading light 26 of the plane wave thus generated is projected onto the PAL-SLM 36. In the present embodiment the reading light source 16 is arranged so that the reading light 26 is incident as p-polarized light to the liquid crystal layer in the PAL-SLM 36. However, the reading light source 16 may be arranged so that the reading light 26 is incident as s-polarized light to the liquid crystal layer, in cases where the angle of incidence of the reading light 26 is small.

The imaging lens 34 projects the CGH image on the LCD 32, onto the photoconductive layer in the PAL-SLM 36. Since the impedance of the photoconductive layer varies according to the two-dimensional intensity distribution of the projected image, the voltage applied to the liquid crystal layer has a distribution according to the intensity distribution of the CGH image. Since an angle of inclination of each liquid crystal molecule is dependent on the applied voltage, a refractive-index distribution according to the intensity distribution of the CGH image is formed in the liquid crystal layer, as a result. The wavefront of the reading light 26 transmitted by the liquid crystal layer is given a two-dimensional phase distribution according to this refractive-index distribution. The reading light 26 phase-modulated in this manner is reflected by the mirror layer interposed between the liquid crystal layer and the photoconductive layer, and emerges from the PAL-SLM 36 toward the Fourier transform lens 22.

The Fourier transform lens 22 receives and Fourier-transforms the phase-modulated reading light 26 to form an optical image of the Fourier-transformed reading light 26 on the output plane 24. The output plane 24 herein is the Fourier transform plane. This optical image has the intensity distribution according to the phase distribution of the reading light 26. An optical pattern is formed on the output plane 24 in this manner. If the reading light 26 has a sufficient power, the optical pattern formation system 10 can be used as a laser processing system to enable processing of the surface of an object placed on the output plane 24, into a desired pattern.

In general, 0-order light appears when light modulated by the phase-modulating spatial light modulator is subjected to Fourier transform. The 0-order light is noise that appears irrespective of the phase distribution given to the reading light. In the present embodiment, the 0-order light is blurred on the output plane 24, so that the luminance of the 0-order light around the optical pattern is reduced. This will be detailed below.

For a comparison with the present embodiment, an example without blurring the 0-order light will be first described. FIG. 2(a) shows a CGH fed to the LCD 32 in this comparative example, and FIG. 2(b) shows an optical pattern formed on the output plane 24 with use of this CGH. In the description hereinafter, an optical pattern to be formed will be referred to as a "target pattern."

The CGH in FIG. 2(a) is a phase pattern corresponding to the star-shaped target pattern as shown in FIG. 2(b). This CGH is calculated so as to achieve the uniform light quantity distribution in the target pattern. However, as shown in FIG. 2(b), the 0-order light appears as a luminescent spot 80 with high luminance, in the center of the star pattern that is actually formed.

In order to reduce the luminance of the 0-order light on the output plane 24, the present embodiment uses a CGH produced by adding a phase pattern having lens effect to a phase pattern corresponding to a target pattern. As described later, when the CGH is provided with the lens effect, the output plane 24 is displaced from the image focusing position of the 0-order light, whereby the 0-order light can be blurred on the output plane 24.

FIGS. 3(a) and 3(b) show examples of phase patterns with lens effect. These phase patterns are called Fresnel zone patterns and are comprised of bright and dark ring zones concentrically and alternately arranged. For the case where a star-shaped optical pattern is to be formed, the controller 14 produces a CGH by adding the phase pattern of FIG. 3(a) or 3(b) to the phase pattern shown in FIG. 2(a), and supplies an image signal representing the CGH, to the LCD 32. FIG. 4(a) shows a CGH obtained by adding the Fresnel zone pattern of FIG. 3(a) to the phase pattern of FIG. 2(a). This CGH is one produced by the simulated annealing technique. Since the luminance of each pixel in the phase pattern represents a phase value as described above, the addition of the two phase patterns means addition of the phase values of corresponding pixels. For the case where the input into the LCD 32 is a 256-gradation image signal having luminance values from 0 to 255, the controller 14 generates the image signal by addition of phase patterns, and if the sun of the luminance values for a pixel exceeds 255, the luminance value of the pixel is determined by subtracting 255 from the sum.

In general, when a plane wave is incident into a lens, the plane wave is focused at the focal length of the lens to form an image. However, when the plane wave is spatially phase-modulated by a phase pattern having lens effect and then introduced into the lens, the phase-modulated wave is focused at a position apart along the optical-axis direction of the lens from the focal plane of the lens. This is because the phase pattern with lens effect has an action to convert the wavefront of the plane wave into a spherical surface. Therefore, when the phase modulation is performed by use of the CGH resulting from the addition of the phase pattern with lens effect, the position of the output plane 24 is displaced from the position obtained without the addition of the phase pattern with lens effect.

Figure 5:
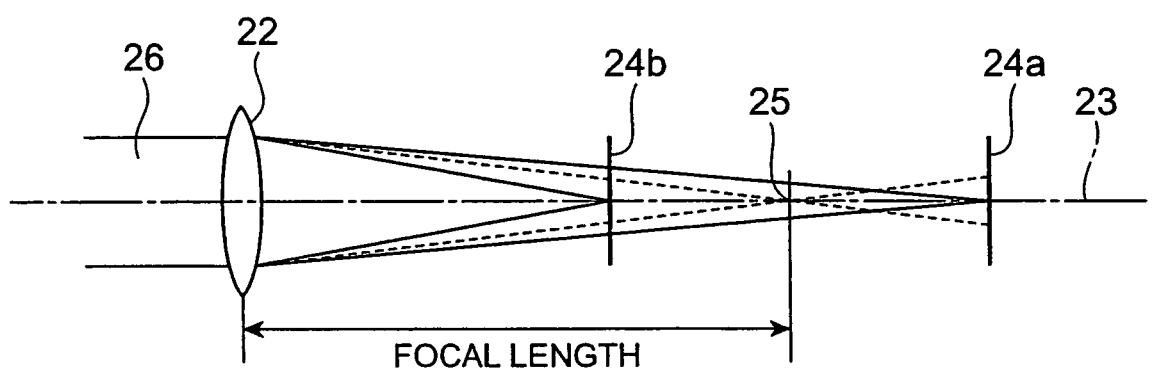
FIG. 5 is a schematic diagram showing the position of the output plane according to the phase pattern.

FIG. 5 is a schematic diagram showing the positions of the output plane 24 according to the Fresnel zone patterns. The Fourier transform lens 22 has the optical axis 23. Dotted lines in FIG. 5 indicate the reading light 26 without the addition of the Fresnel zone pattern. In this case, the output plane 24 is located at the focal length of the Fourier transform lens 22. Namely, the output plane 24 is equal to the image-side focal plane of the Fourier transform lens 22. Both of the images of the target pattern and the 0-order light are formed on this focal plane. In contrast, when the Fresnel zone pattern of FIG. 3(a) is added to the phase pattern for the target pattern, the output plane 24 shifts away from the Fourier transform lens 22 with respect to the image-side focal point 25 of the Fourier transform lens 22, in parallel with the optical axis 23 of the Fourier transform lens 22. This output plane is indicated by reference symbol 24a in FIG. 5. FIG. 3(b) shows the Fresnel zone pattern resulting from inversion of the white and black portions in the pattern of FIG. 3(a). When this Fresnel zone pattern is added to the CGH for the target pattern, the output plane 24 shifts toward the Fourier transform lens 22 with respect to the image-side focal point 25, in parallel with the optical axis 23 of the Fourier transform lens 22. This output plane is indicated by reference symbol 24b in FIG. 5. The distance of displacement of the output plane 24 is dependent upon the shape of the Fresnel zone pattern.

In the present embodiment, as described above, the target pattern is formed on the output plane 24 displaced from the image-side focal plane of the Fourier transform lens 22 by virtue of the phase pattern with lens effect. However, since the 0-order light, by nature, is not subjected to the phase modulation by the spatial light modulator 12, the image thereof is focused on the image-side focal plane of the Fourier transform lens 22, without being affected by the phase pattern with lens effect. Accordingly, the 0-order light is not focused but blurred on the output plane 24 displaced from the image-side focal plane.

FIG. 4(b) shows an optical pattern formed on the output plane 24 with use of the CGH of FIG. 4(a) resulting from the addition of the Fresnel zone pattern. As apparent from comparison with the optical pattern of FIG. 2(b) formed without the addition of the Fresnel zone pattern, the luminance of the 0-order light is lowered and the 0-order light is inconspicuous on the output plane 24.

Thus, by displacing the output plane 24 where the optical pattern is formed, from the focal plane of the Fourier transform lens 22, the 0-order light is blurred on the output plane 24 and the luminance thereof can be reduced. In addition, since the 0-order light is not blocked, the shape of the optical pattern is not degraded. Therefore, there are no restrictions on the shape of the optical pattern.

Second Embodiment

Figure 6:
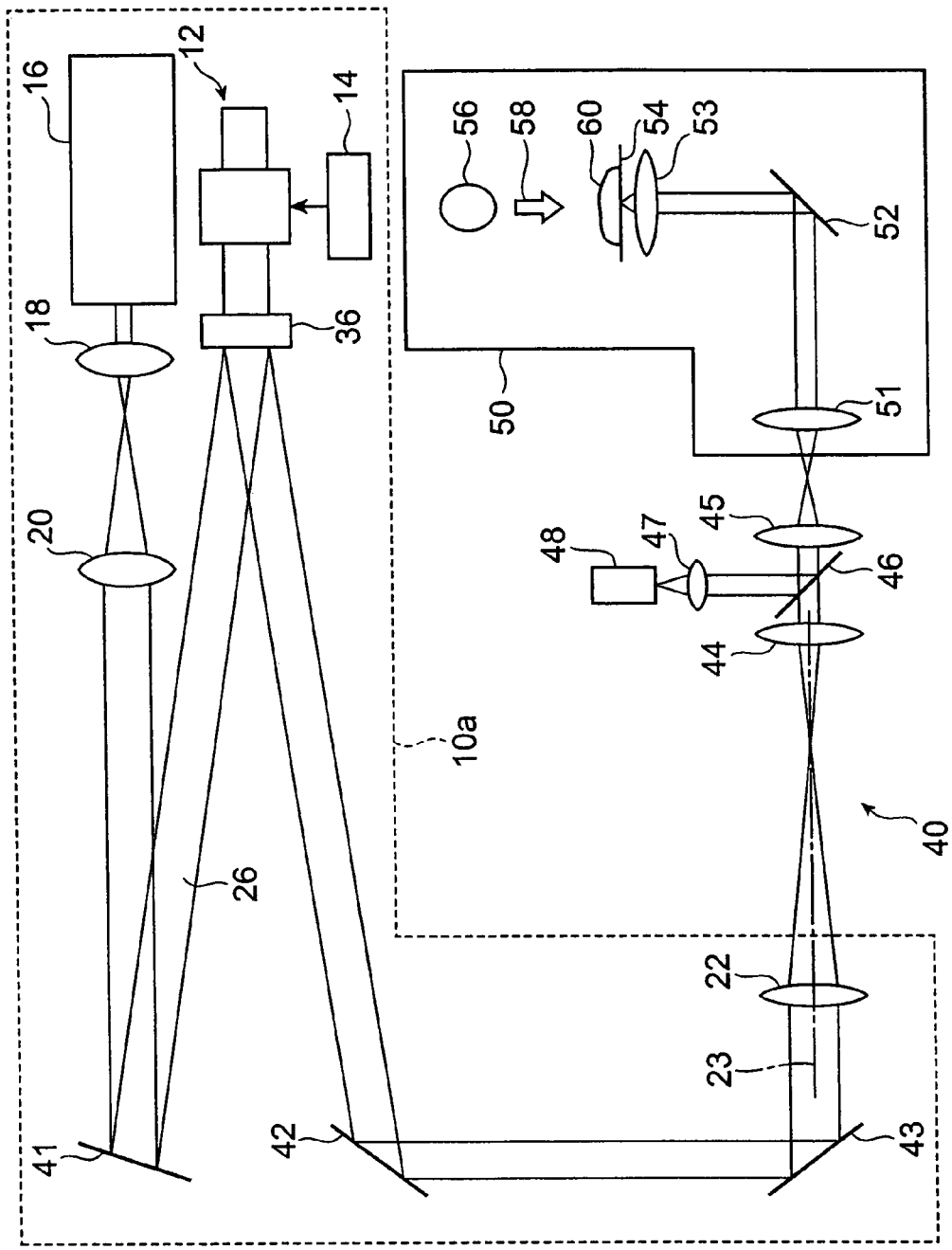
FIG. 6 is a schematic diagram showing the configuration of the second embodiment.

The second embodiment of the present invention will be described below. FIG. 6 is a schematic diagram showing the configuration of an optical pattern formation system in the present embodiment. This optical pattern formation system 40 uses an optical pattern formation system 10a similar to the first embodiment to form an optical pattern and focus an image of the optical pattern on an observation plane in a microscope 50.

Mirrors 41-43 for reflecting the reading light 26 are arranged in the optical pattern formation system 10a. An image of the optical pattern formed by the optical pattern formation system 10a is transferred into the microscope 50 by relay lenses 44 and 45. This optical pattern is projected onto a bottom surface of a sample stage 54 by a relay lens 51, mirror 52, and objective lens 53 in the microscope 50. The sample stage 54 is provided with a window (not shown) for transmitting the optical pattern, and the optical pattern passes through this window to form an image on the upper surface, i.e., the observation plane, of the sample stage 54. In order for focusing, it is possible to adjust the distance between the objective lens 53 and the sample stage 54.

A sample 60 is mounted on the upper surface of the sample stage 54 using a preparation not shown in the figure. The sample 60 is irradiated with white illumination light 58 from an incident-light illumination device 56 placed above the sample stage 54. An optical image of the sample 60 formed by this illumination is transmitted to the outside of the microscope 50 by the objective lens 53, mirror 52, and relay lens 51. A beam splitter 46 is placed between the relay lenses 44 and 45. The optical image of the sample 60 is transmitted up to a CCD camera 48 by relay lens 45, beam splitter 46, and relay lens 47, to be picked up by the CCD camera 48. An observer views an output image of the CCD camera 48 to observe the sample 60.

When an optical pattern including one or more point images is focused on the observation plane of the microscope 50, a particle in the sample 60 can be trapped at the position of each point image by the pressure of light. The trapped particle can be moved as the position of the point image is gradually changed by controlling the CGH fed to the spatial light modulator 12. The movement of the trapped particle may be in one, two or three dimensions. For example, if the CGH is repeatedly updated by adding a phase pattern having lens effect to a phase pattern corresponding to a point image while changing the strength of the lens effect with time, it is possible to move the trapped particle in parallel to the optical axis, thereby achieving the movement in three dimensions. Thus, the optical pattern formation system 40 functions as an optical tweezer. In the description hereinafter, the optical tweezer is assumed to use an optical pattern having a plurality of point images, i.e., a multi-point-image pattern.

FIG. 7(a) shows an output image of the CCD camera 48 when a CGH consisting of only a phase pattern for a multi-point-image pattern is fed into the spatial light modulator 12. This CGH is one produced by the kinoform technique. As shown in FIG. 7(a), the 0-order light (a white luminescent spot 82 at the center of FIG. 7(a)) appears at high luminance in the multi-point-image pattern, for the case without the addition of a phase pattern with lens effect. When the 0-order light exists in the multi-point-image pattern, a particle can also be trapped at the position of the 0-order light. However, tapping of a particle at an unintended position is not preferred.

FIG. 7(b) shows an output image of the CCD camera 48 when a CGH resulting from the addition of the Fresnel zone pattern of FIG. 3(a) to the phase pattern for the multi-point-image pattern is fed into the spatial light modulator 12. This CGH is also one produced by the kinoform technique. The lens effect of the Fresnel zone pattern displaces the plane where the multi-point-image pattern is formed, from the image focusing position of the 0-order light. Therefore, by adjusting the distance between the objective lens 53 and the sample stage 54 so as to focus the image of the multi-point-image pattern on the observation plane of the microscope 50, only the 0-order light is blurred in the multi-point-image pattern, as shown in FIG. 7(*b*), and the luminance thereof is reduced. This enables particles to be trapped at desired positions only. In addition, the positions of the point images are not restricted because the 0-order light is not blocked.

Third Embodiment

Figure 8:
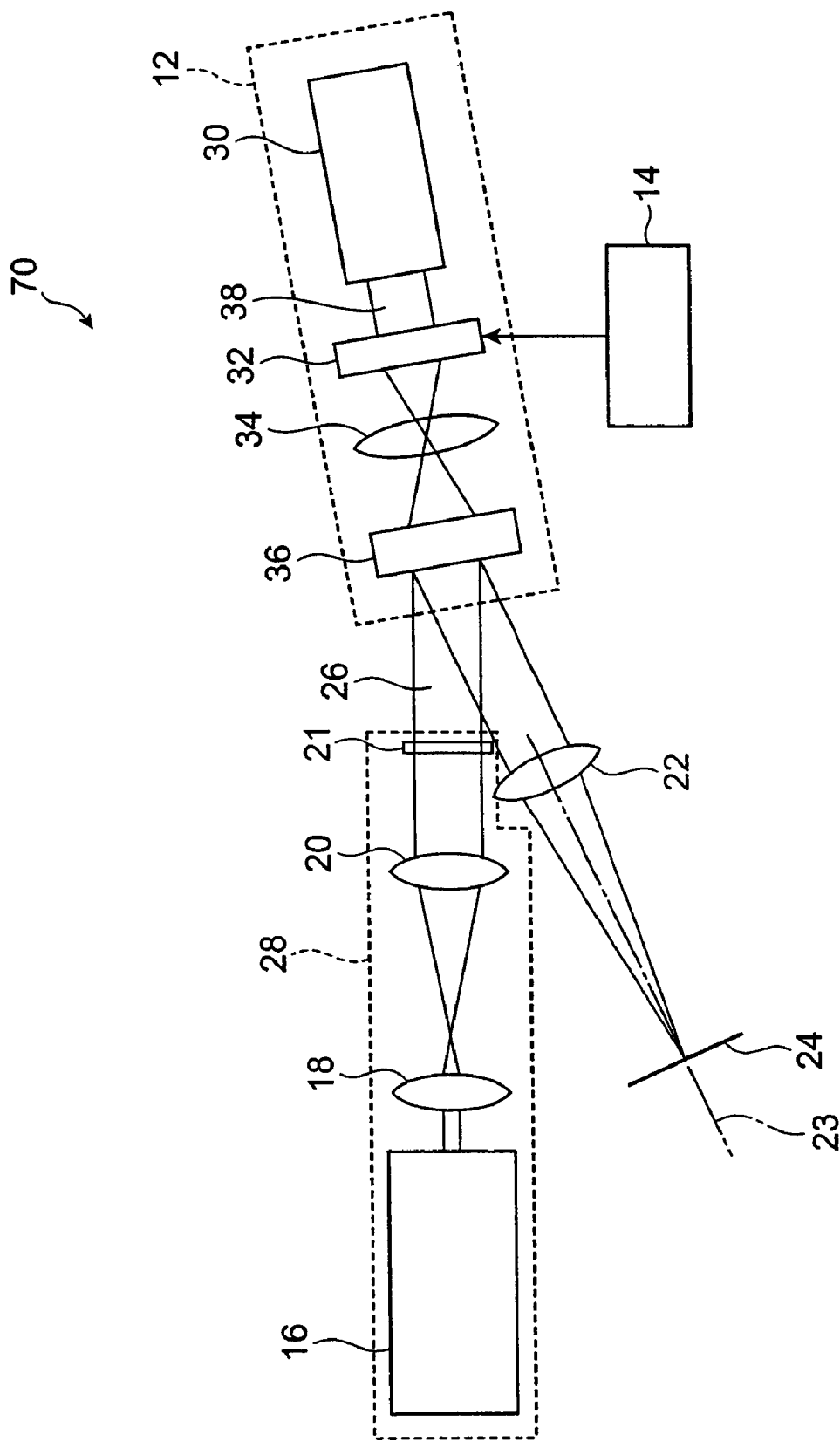
FIG. 8 is a schematic diagram showing the configuration of the third embodiment.

The third embodiment of the present invention will be described below. FIG. 8 is a schematic diagram showing the configuration of an optical pattern formation system in the present embodiment. This optical pattern formation system 70 has a configuration that is obtained by adding a phase plate 21 on the optical path between collimator lens 20 and PAL-SLM 36 in the optical pattern formation system 10 of the first embodiment. In the present embodiment, therefore, the light emitting device 28 is configured of the phase plate 21 as well as the reading light source 16, beam expander 18, and collimator lens 20. The reading light 26 is emitted from the reading light source 16 and travels through the beam expander 18, collimator lens 20, ad phase plate 21 to irradiate the PAL-SLM 36.

The phase plate 21 is a transmissive phase-modulating spatial light modulator. The phase plate 21 provides an irregular phase distribution to the wavefront of the plane wave transmitted by the phase plate 21, to distort the wavefront. This wavefront distortion is fixed and thus invariable unless the phase plate 21 is replaced with another one. The phase plate 21 may be, for example, a random phase plate for providing an irregular phase distribution to the wavefront of the plane wave.

The reading light 26 with the distorted wavefront is projected onto the PAL-SLM 36 in this manner. The wavefront distortion of the reading light 26 degrades the degree of image focusing on the output plane 24. If in the optical pattern formation system 10 the spatial light modulator 12 is not operated and is set to function as a mirror, the image of the reading light 26 on the output plane 24 will be blurred as compared with the case without the phase plate 21.

The present embodiment makes use of this wavefront distortion to degrade the degree of image focusing for only the 0-order light, and thereby to further reduce the luminance of the 0-order light on the output plane 24. In order to eliminate the influence on the target pattern on the output plane 24 due to the wavefront distortion by the phase plate 21, the controller 14 produces a CGH by adding a phase pattern for compensating the wavefront distortion, to the phase pattern for the target pattern.

Figure 9:
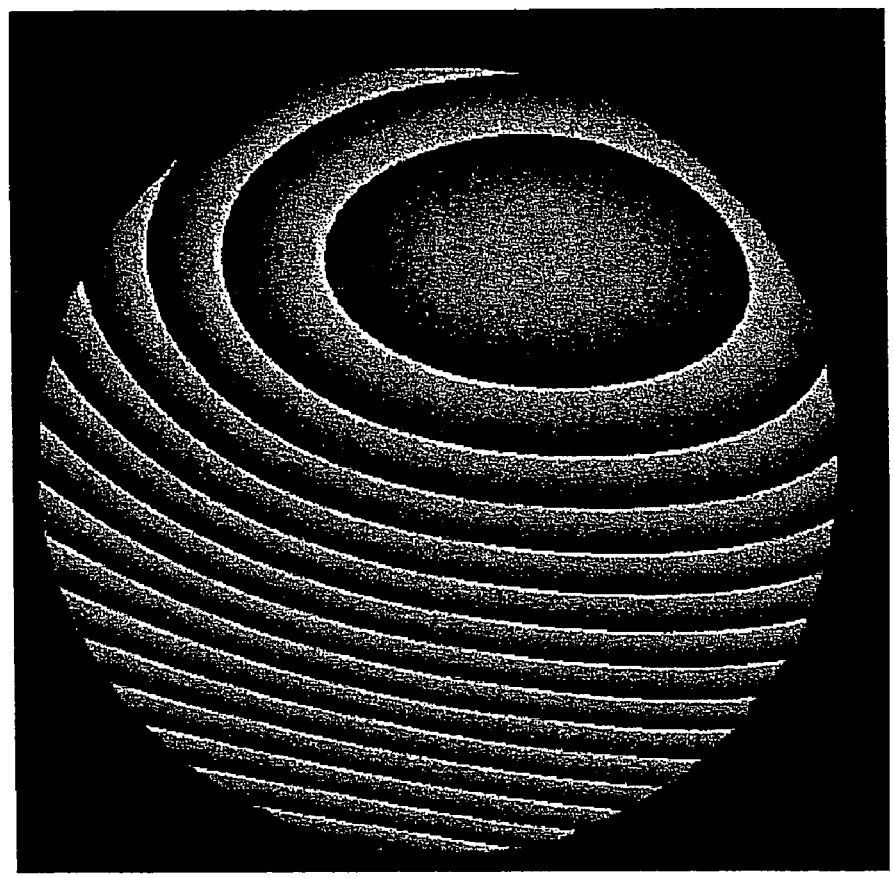
FIG. 9 shows a wavefront distortion compensating pattern.

FIG. 9 shows an example of the wavefront distortion compensating pattern. This wavefront distortion compensating pattern effects phase modulation on the reading light 26 to cancel out the wavefront distortion of the reading light 26 by the phase plate 21. This wavefront distortion is characterized by a phase distribution given to the wavefront of the plane wave. The phase distribution corresponding to the wavefront distortion can be determined by irradiating the phase plate 21 with a plane wave and measuring the wavefront of the wave transmitted through the phase plate 21, using a wavefront sensor. After the phase distribution of the wavefront distortion is specified, the phase pattern for compensating the wavefront distortion can be calculated. For example, the wavefront distortion compensating pattern may be produced by inverting the signs in the phase distribution of the wavefront distortion.

For the case where a star-shaped optical pattern is to be formed, the controller 14 produces a CGH by adding the wavefront distortion compensating pattern of FIG. 9 to the phase pattern shown in FIG. 4(*a*), and supplies an image signal representing the produced CGH to the LCD 32. With the addition of the wavefront distortion compensating pattern, the phase modulation in the PAL-SLM 36 cancels the wavefront distortion by the phase plate 21. This results in forming the target pattern without a blur on the output plane 24. On the other hand, the 0-order light is not subjected to the phase modulation in the PAL-SLM 36, and therefore the wavefront distortion remains in the 0-order light. This wavefront distortion further degrades the degree of image focusing of the 0-order light on the output plane 24, and the luminance thereof is further reduced.

Thus, the luminance of the 0-order light can be largely reduced on the output plane 24 due to the combination of the shift of the output plane 24 by the phase pattern with lens effect, with the effect of the wavefront distortion by the phase plate 21. Since the wavefront distortion given to the components other than the 0-order light in the reading light 26 is compensated by the phase pattern for the compensation, the optical pattern can be prevented from blurring on the output plane 24. This optical pattern formation system 70 can also be applied to an optical tweezer as in the second embodiment.

Fourth Embodiment

An optical pattern formation system of the present embodiment has the same configuration as in the third embodiment shown in FIG. 8, and is able to form a desired two-dimensional optical pattern on the output plane 24. As in the first to third embodiments, the reading light source 16 is arranged so that the reading light 26 is incident as p-polarized light to the liquid crystal layer in the PAL-SLM 36. However, when the angle of incidence of the reading light 26 is small, the reading light source 16 may be arranged so that the reading light 26 is incident as s-polarized light to the liquid crystal layer.

The wavefront distortion given to the reading light 26 by the phase plate 21 serves to reduce the degree of image focusing of the reading light 26. Therefore, the use of the phase plate 21 permits the 0-order light to be blurred on the output plane 24, without use of a phase pattern with lens effect as in the third embodiment. In the present embodiment, as described above, the luminance of the 0-order light around the target pattern is reduced by lowering the degree of image focusing of only the 0-order light in the reading light 26 by means of the phase plate 21. The present embodiment is different from the third embodiment in that the phase pattern with lens effect is not added to the phase pattern corresponding to the target pattern in the present embodiment. This will be detailed below.

First, an example without lowering the degree of image focusing of the 0-order light will be described for a comparison with the present embodiment. This comparative example uses the optical pattern formation system 10 without the phase plate 21. In addition, the CGH shown in FIG. 2(*a*) is fed to the LCD 32 to form the star-shaped target pattern shown in FIG. 2(*b*), on the output plane 24. The CGH shown in FIG. 2(*a*) is calculated so as to achieve the uniform light quantity distribution in the target pattern, as described above, but the 0-order light appears as a luminescent spot 80 with high luminance at the center of the target pattern that is actually formed, as shown in FIG. 2(*b*).

In order to reduce the luminance of the 0-order light on the output plane 24, the present embodiment uses the phase plate 21 to provide a distortion to the wavefront of the reading light 26. This wavefront distortion degrades the degree of image focusing on the output plane 24. If in the optical pattern formation system 10 the spatial light modulator 12 is not operated and is set to function as a mirror, the image of the reading light 26 will be blurred on the output plane 24, as compared with the case without the phase plate 21.

The present embodiment makes use of this wavefront distortion to degrade the degree of image focusing of only the 0-order light, thereby reducing the luminance of the 0-order light on the output plane 24. In order to eliminate the influence on the target pattern on the output plane 24 due to the wavefront distortion by the phase plate 21, the controller 14 produces a CGH by adding a phase pattern for compensating the wavefront distortion, to the phase pattern for the target pattern. An example of this wavefront distortion compensating pattern has been already described with reference to FIG. 9.

When forming a star-shaped optical pattern, the controller 14 produces a CGH by adding the wavefront distortion compensating pattern of FIG. 9 to the phase pattern shown in FIG. 2(a), and supplies an image signal representing the produced CGH, to the LCD 32. FIG. 10(a) shows this CGH. This CGH is one produced by the simulated annealing technique. Since the luminance of each pixel in the phase pattern indicates a phase value as described above, the addition of two phase patterns means addition of the phase values of corresponding pixels. For the case where the input into the LCD 32 is a 256-gradation image signal having luminance values from 0 to 255, the controller 14 generates the image signal by addition of phase patterns, and if the sum of the luminance values for a pixel exceeds 255, the luminance value of the pixel is determined by subtracting 255 from the sum.

The controller 14 generates the image signal corresponding to the CGH produced in this manner, and feeds it to the LCD 32. By the addition of the wavefront distortion compensating pattern, the phase modulation in the PAL-SLM 36 cancels out the wavefront distortion by the phase plate 21. This results in forming the target pattern without a blur on the output plane 24. On the other hand, the 0-order light is not subjected to the phase modulation in the PAL-SLM 36, so that the wavefront distortion remains in the 0-order light. This wavefront distortion degrades the degree of image focusing of the 0-order light on the output plane 24, whereby the 0-order light its blurred.

FIG. 10(b) shows an optical pattern formed on the output plane 24 by use of the CGH of FIG. 10(a) with the addition of the wavefront distortion compensating pattern. As apparent from comparison with the optical pattern of FIG. 2(b) formed without the addition of the wavefront distortion compensating pattern, the luminance of the 0-order light is lowered and the 0-order light is inconspicuous on the output plane 24.

Thus, by providing the reading light 26 with the wavefront distortion, it is possible to blur the 0-order light on the output plane 24 and reduce the luminance thereof. Since the wavefront distortion provided to the components other than the 0-order light in the reading light 26 is compensated by the phase pattern for compensation, the optical pattern can be prevented from blurring on the output plane 24. In addition, the shape of the optical pattern is not degraded because the 0-order light is not blocked. Therefore, the shape of the optical pattern is not restricted, either.

Fifth Embodiment

Figure 11:
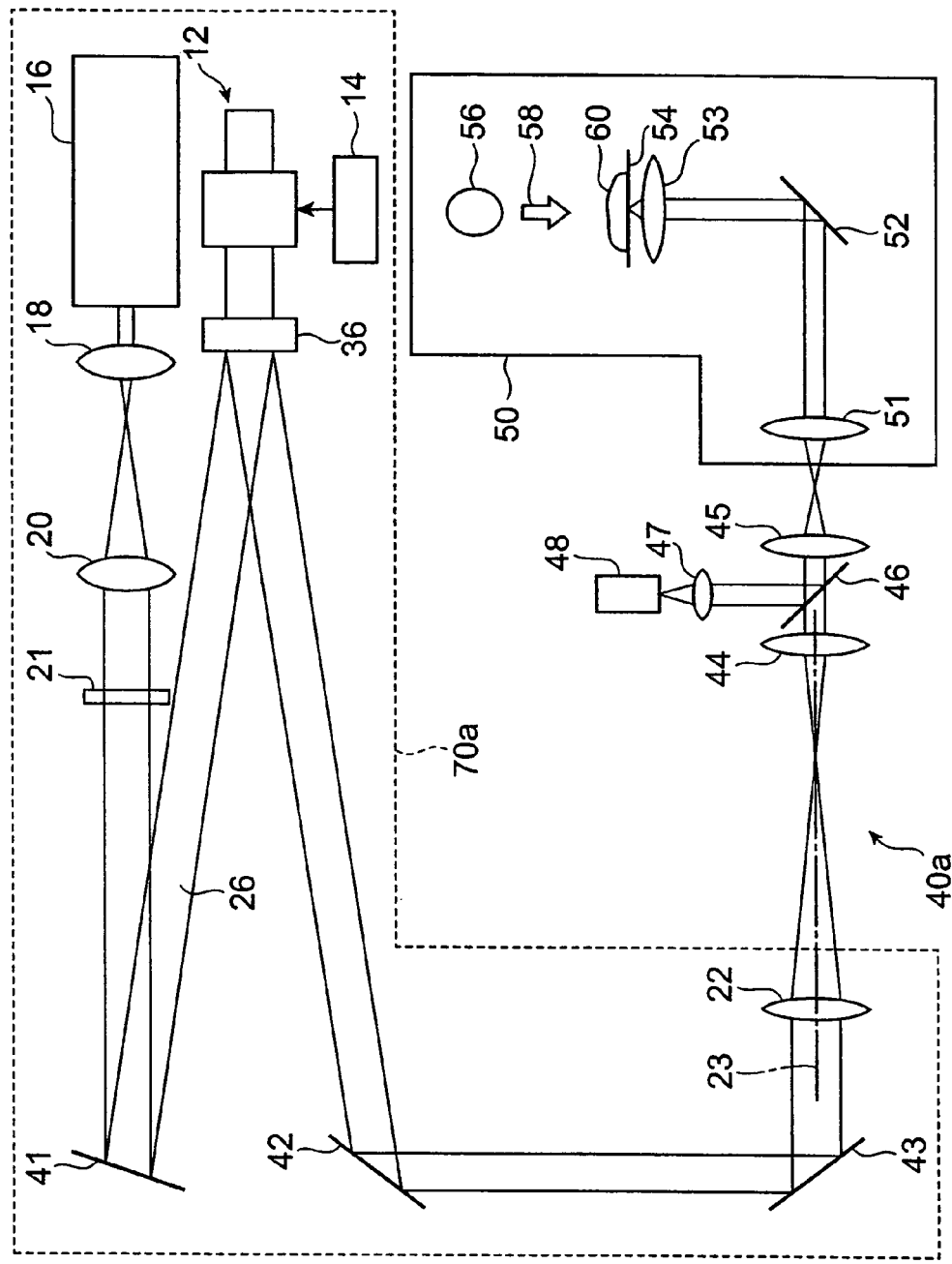
FIG. 11 is a schematic diagram showing the configuration of the fifth embodiment.

The fifth embodiment of the present invention will be described below. FIG. 11 is a schematic diagram showing the configuration of an optical pattern formation system in the present embodiment. This optical pattern formation system 40a has a configuration that is obtained by replacing the optical pattern formation system 10a in the second embodiment with an optical pattern formation system 70a similar to the fourth embodiment. As in the fourth embodiment, the controller 14 produces a CGH by adding the phase pattern for compensating the wavefront distortion by the phase plate 21, to the phase pattern corresponding to the target pattern, and supplies an image signal representing the produced CGH, to the LCD 32 nm the spatial light modulator 12.

As in the second embodiment, the optical pattern formation system 40a uses the optical pattern formation system 70a to form an optical pattern and focus an image of the optical pattern on the observation plane in the microscope 50. When an optical pattern including one or more point images is focused on the observation plane of the microscope 50, a particle in a sample 60 can be trapped at the position of each point image by the Assure of light. The trapped particle can be moved as the position of the point image is gradually changed by controlling the CGH fed to the spatial light modulator 12. The movement of the trapped particle may be in one, two or three dimensions. Thus, the optical pattern formation system 40a functions as an optical tweezer. In the description hereinafter, the optical tweezer is assumed to use an optical pattern having a plurality of point images, i.e., a multi-point-image pattern.

FIG. 12(a) shows an output image of the CCD camera 48 where a CGH consisting of only a phase pattern for a multi-point-image pattern is fed to the spatial light modulator 12, while the phase plate 21 is removed from the optical pattern formation system 70a. This CGH is one produced by the kinoform technique. As shown in FIG. 12(a), without the addition of the wavefront distortion compensating pattern, the 0-order light (a white luminescent spot encircled in FIG. 12(a)) appears at high luminance in the multi-point-image pattern. When the 0-order light exists in the multi-point-image pattern, a particle will also be trapped at the position of the 0-order light. However, trapping of a particle at an unintended position is not preferred.

FIG. 12(b) shows an output image of the CCD camera 48 when a CGH ring from addition of the wavefront distortion compensating pattern of FIG. 9 to the phase pattern for the multi-point-image pattern is fed to the spatial light modulator 12, while the phase plate 21 is installed in the light emitting device 28. This CGH is one produced by the kinoform technique. The degree of image focusing of the 0-order light is degraded by the wavefront distortion of the reading light 26 by the phase plate 21, while the wavefront distortion of the components other than the 0-order light is canceled out by the wavefront distortion compensating pattern. Therefore, only the 0-order light is blurred in the multi-point-image pattern, as shown in FIG. 12(b), and the luminance thereof is lowered. This enables particles to be trapped at each desired positions only. In addition, the positions of the point images are not restricted because the 0-order light is not blocked.

The controller 14 may be arranged to produce the CGH by adding the phase pattern with lens effect to the phase pattern corresponding to the target pattern and the phase pattern for compensating the wavefront distortion by the phase plate 21, and to supply the image signal representing the produced CGH, to the LCD 32 in the spatial light modulator 12, as in the third embodiment. In this case, the luminance of the 0-order light can be further reduced on the output plane 24 due to the combination of the advantages from the shift of the output plane 24 by the phase pattern with lens effect and from the wavefront distortion by the phase plate 21. This results in being more likely for particles to be trapped at desired positions only.

The present invention was described above in detail on the basis of the embodiments thereof. However, the present invention is by no means limited to the above embodiments. The present invention can be modified in various ways without departing from the scope of the invention.

For example, instead of the Fresnel zone pattern, any other phase pattern with lens effect may be used. The spatial light modulator 12 may be replaced by any other phase-modulating spatial light modulator of the electrically addressing type. For example, it is possible to adopt a transmissive or reflective phase-modulating LCD, or a deformable mirror. The LCD 32 may be replaced by any other intensity-modulating spatial light modulator of the electrically addressing type. This may be of either the transmission type or the reflection type. The PAL-SLM 36 may be replaced by any other phase-modulating spatial light modulator of the optically addressing type. This may be of either the transmission type or the reflection type. The phase modulator for providing the wavefront of the reading light with distortion may be any other phase-modulating spatial light modulator, instead of the phase plate 21. This may be of either the transmission type or the reflection type. Each of the Fourier transform lens 22 and the imaging lens 34 may be a single lens or a compound lens which consists of a plurality of optical elements.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the spirit and scope of the following claims.

What is claimed is:

1. A method of forming an optical pattern, comprising:
generating reading light having a phase;
feeding a phase pattern into a spatial light modulator while irradiating the spatial light modulator with the reading light to modulate the phase of the reading light according to the phase pattern; and
Fourier-transforming the modulated reading light and focusing an image of the Fourier-transformed reading light on an output plane, the Fourier-transformed reading light containing 0-order light, and the 0-order light being blurred on the output plane,
wherein the Fourier-transforming the modulated reading light and focusing an image of the Fourier-transformed reading light includes focusing an image of the 0-order light on a plane different from the output plane, thereby blurring the 0-order light on the output plane, and
wherein the generating of the reading light includes providing a plane wave with a wavefront distortion,
the method further comprising producing a phase pattern by adding a subsidiary phase pattern for compensating the wavefront distortion to a principal phase pattern corresponding to the optical pattern, prior to the modulating the phase of the reading light.

2. The method according to claim 1,
wherein the Fourier-transforming the modulated reading light and focusing an image of the Fourier-transformed reading light includes using a lens having a focal plane and an optical axis to Fourier-transform the modulated reading light, and
wherein the output plane is located at a position apart in parallel with the optical axis of the lens from the focal plane of the lens.

3. The method according to claim 2, further comprising producing the phase pattern by adding a subsidiary phase pattern with lens effect to a principal phase pattern corresponding to the optical pattern, prior to the modulating the phase of the reading light.

4. The method according to claim 3, wherein the subsidiary phase pattern is a Fresnel zone pattern.

5. The method according to claim 4, wherein the generating the reading light includes providing a plane wave with a wavefront distortion to generate the reading light, and
wherein the producing the phase pattern includes adding a phase pattern for compensating the wavefront distortion to the principal and subsidiary phase patterns.

6. The method according to claim 1, wherein the
reading light generated from the plane wave has a phase distribution corresponding to the wavefront distortion, and
wherein the producing the phase pattern includes inverting signs in the phase distribution to produce the subsidiary phase pattern.

7. An optical pattern formation system, comprising:
a light emitting device for emitting reading light having a phase;
a phase-modulating spatial light modulator for modulating the phase of the reading light according to a phase pattern fed into the spatial light modulator while irradiated with the reading light; and
a lens for Fourier-transforming the modulated reading light and focusing an image of the Fourier-transformed reading light on an output plane, the Fourier-transformed reading light containing 0-order light, and the 0-order light being blurred on the output plane,
wherein an image of the 0-order light is focused on a plane different from the output plane, whereby the 0-order light is blurred on the output plane,
the system further comprising a controller for producing the phase pattern by adding a subsidiary phase pattern for compensating a wavefront distortion to a principal phase pattern corresponding to the optical pattern to feed the produced phase pattern into the spatial light modulator,
wherein the light emitting device provides a plane wave with the wavefront distortion to generate the reading light.

8. The system according to claim 7,
wherein the lens has a focal plane and an optical axis, and
wherein the phase pattern controls the modulation so as to displace the output plane in parallel with the optical axis of the lens from the focal plane of the lens.

9. The system according to claim 8, wherein the controller produces the phase pattern by adding a subsidiary phase pattern with lens effect to a principal phase pattern corresponding to the optical pattern.

10. The system according to claim 9, wherein the subsidiary phase pattern is a Fresnel zone pattern.

11. The system according to claim 9, wherein the light emitting device provides a plane wave with a wavefront distortion to generate the reading light, and
wherein the controller produces the phase pattern by adding a phase pattern for compensating the wavefront distortion to the principal and subsidiary phase patterns.

12. The system according to claim 8, wherein the controller feeds the phase pattern as an electric image signal into the spatial light modulator, and
wherein the spatial light modulator has a liquid crystal display device for displaying an optical image according to the fed image signal; an illumination device for illuminating the liquid crystal display device with illumination light to project the displayed optical image, the projected optical image having an intensity distribution;

and a modulation element for receiving the reading light and the projected optical image to modulate the phase of the reading light according to the intensity distribution of the projected optical image.

13. The system according to claim 7, wherein the reading light generated from the plane wave has a phase distribution corresponding to the wavefront distortion, and wherein the controller produces the subsidiary phase pattern by inverting signs in the phase distribution.

14. An optical tweezer comprising the system according to claim 7, the optical tweezer being arranged to irradiate a sample with the optical pattern formed by the optical pattern formation system to trap the sample.

* * * * *